US008599788B2

(12) United States Patent
Song et al.

(10) Patent No.: US 8,599,788 B2
(45) Date of Patent: Dec. 3, 2013

(54) METHOD AND SYSTEM FOR MOBILE SECURE SOCKET LAYER IN VIRTUAL PRIVATE NETWORKS

(75) Inventors: Yu Song, Pleasanton, CA (US); Doreen Cheng, San Jose, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1338 days.

(21) Appl. No.: 11/725,380

(22) Filed: Mar. 19, 2007

(65) Prior Publication Data

US 2007/0218912 A1     Sep. 20, 2007

Related U.S. Application Data

(60) Provisional application No. 60/784,330, filed on Mar. 20, 2006.

(51) Int. Cl.
*H04W 4/00* (2009.01)
(52) U.S. Cl.
USPC ........... 370/331; 370/352; 370/328; 370/345; 375/340; 375/260; 455/522; 709/228

(58) Field of Classification Search
USPC .................... 455/436–444; 370/331
See application file for complete search history.

(56) References Cited

U.S. PATENT DOCUMENTS

| 7,046,647 | B2 * | 5/2006 | Oba et al. ................ 370/331 |
| 7,873,994 | B1 * | 1/2011 | Wu ............................ 726/14 |
| 2002/0007415 | A1 * | 1/2002 | Douglis et al. ............. 709/230 |
| 2004/0192309 | A1 * | 9/2004 | Watanabe et al. .......... 455/439 |
| 2005/0083883 | A1 * | 4/2005 | Ho et al. .................... 370/331 |
| 2005/0086510 | A1 * | 4/2005 | Nicodemus et al. ........ 713/200 |
| 2005/0176473 | A1 * | 8/2005 | Melpignano ................ 455/574 |
| 2005/0239494 | A1 * | 10/2005 | Klassen et al. ........... 455/550.1 |
| 2007/0165574 | A1 * | 7/2007 | Srey et al. .................. 370/331 |
| 2007/0207804 | A1 * | 9/2007 | Sharma et al. ............. 455/436 |

* cited by examiner

*Primary Examiner* — Dwayne Bost
*Assistant Examiner* — Gerald Johnson
(74) *Attorney, Agent, or Firm* — Kenneth L. Sherman, Esq.; Michael Zarrabian, Esq.; Sherman & Zarrabian LLP

(57) ABSTRACT

A communication method and system enables a mobile device to establish and maintain a secure connection to a server in a target network via connecting networks. The connection is maintained even when the mobile device hands off (moves) from one connecting network to another connecting network.

27 Claims, 3 Drawing Sheets

METHOD AND SYSTEM FOR MOBILE SECURE SOCKET LAYER IN VIRTUAL PRIVATE NETWORKS

RELATED APPLICATION

This application claims priority from U.S. Provisional Patent Application Ser. No. 60/784,330, filed Mar. 20, 2006 incorporated herein by reference.

FIELD OF THE INVENTION

The present invention relates to mobile secure networks, and in particular, to mobile device secure connection in virtual private networks.

BACKGROUND OF THE INVENTION

Mobile wireless devices with connectivity to wireless networks such as cellular networks and IEEE 802.11x (WiFi) networks are increasing in popularity. Ideally, mobile devices allow users to connect to their target network from anywhere, at anytime. The virtual private network (VPN) approach has been the dominant choice for secure connectivity between mobile wireless devices and networks.

Unlike stationary devices, mobile devices move from one network to another network. As such, a mobile device's network attachment is not fixed. Depending on the location of the mobile device and the available wireless networks in its vicinity, a mobile device can attach to different networks at different times.

In the Internet Protocol version 4 (IPv4) network infrastructure, each time a mobile device attaches to a network, the mobile device receives a different network address. Such mobility, however, breaks the VPN connection because a VPN connection assumes that the VPN endpoints (i.e., the VPN client and the VPN server) have persistent IP addresses. For a mobile wireless device, the VPN client IP address changes during network handoff from one wireless network to another.

To overcome this problem, a conventional approach has been to use Internet Protocol Security (IPSec) over a Mobile IP tunnel, which assumes that the mobile wireless device has a mobile IP address as opposed to a regular IP address. The mobile IP address does not change when a mobile wireless device moves from one network to another network, and therefore, the mobile wireless device has a persistent IP address. This approach uses IPSec VPN technology to establish a VPN over the mobile IP.

Such an approach, however, has several disadvantages. The first disadvantage is that it is tied to a specific IP technology, namely, the mobile IP. With the slow adoption of mobile IP, a large number of the mobile wireless devices will not have mobile IP in the foreseeable future. The second disadvantage is that such an approach requires a particular VPN technology, namely, the IPSec VPN. IPSec VPN requires each mobile wireless device to have the IPSec in the operating system kernel, which is difficult to configure. The third disadvantage of such an approach is that using tunnels is inefficient and difficult to manage.

A technical trend in the VPN technology has been to use Secure Socket Layer/Transport Layer Security (SSL/TLS) as the base for the VPN connection. A SSL/TLS VPN establishes a VPN over a SSL/TLS connection. The current SSL/TLS VPN connection breaks when a mobile device moves from one network to another, because the SSL/TLS connection is lost when a mobile wireless device moves out of a network, and therefore, a new SSL/TLS connection must be established when the mobile wireless device moves into another network.

A conventional approach for maintaining a connection between a VPN server and a mobile device is to use a migratable socket. A migratable socket maintains an open socket regardless of the mobile device's network attaching point. Once the socket is maintained, upper layer protocols, such as SSL/TLS can be maintained as well.

However, this approach requires the additional functionalities of a network router, as illustrated by an example herein. Assume that a mobile wireless device in a wireless network A establishes a VPN connection to its home network (e.g., network C), and at a later time, the mobile device moves from the wireless network A to another wireless network B while keeping the VPN open. To accomplish this, a router in the wireless network A must forward packets from the network C to the router in the wireless network B such that from the socket's point of view, the connection is still open. This approach requires the additional functionalities of the network router. There is, therefore, a need for a method and system for secure connection of mobile devices to VPN wireless networks.

BRIEF SUMMARY OF THE INVENTION

The present invention provides a method and system that enable communication for a mobile device, by establishing a secure connection between the mobile device and a server in a target network via a connecting network, which is connected to the target network via a communication medium. The secure connection between the mobile device and the server in the target network is maintained when the mobile device hands off from the connecting network to another connecting network which is connected to the target network via a communication medium.

In one implementation, the present invention enables the mobile device to maintain a secure connection such as a SSL/TLS VPN session to a server in the target network when the mobile device hands off (moves) from one connecting network to another connecting network. The output packets from a client in the mobile device to the server are cached during handoff to a new network. Then, upon handoff, a resume feature of the server is used by the client to resume the session with the server via the new network, instead of establishing a new session.

As such, the present invention allows maintaining a VPN connection for mobile device handoff between networks. This is achieved using a mobile secure socket layer in a VPN network. Such a secure socket layer enables a mobile device to maintain a SSL/TLS VPN connection to a network when the mobile device hands off (moves) from one network to another network on the Internet, despite differing network attachments at different times. In one example, implementation, the output packets from a mobile device (SSL/TLS client) to a VPN server are cached during the network handoff. Further, the resume feature of the SSL/TLS protocol is utilized such that when a mobile device moves to a new network, the SSL/TLS client resumes the SSL/TLS session instead of establishing a new session.

These and other features, aspects and advantages of the present invention will become understood with reference to the following description, appended claims and accompanying figures.

DETAILED DESCRIPTION OF THE INVENTION

The present invention provides a method and system for maintaining a VPN connection for mobile device handoff between networks. This is achieved using a mobile secure socket layer in a VPN network. In one embodiment, such a method and system enable a mobile device (wireless or otherwise) to maintain a SSL/TLS VPN connection to a network when the mobile device hands off from one network to another network on the Internet.

Figure 1:
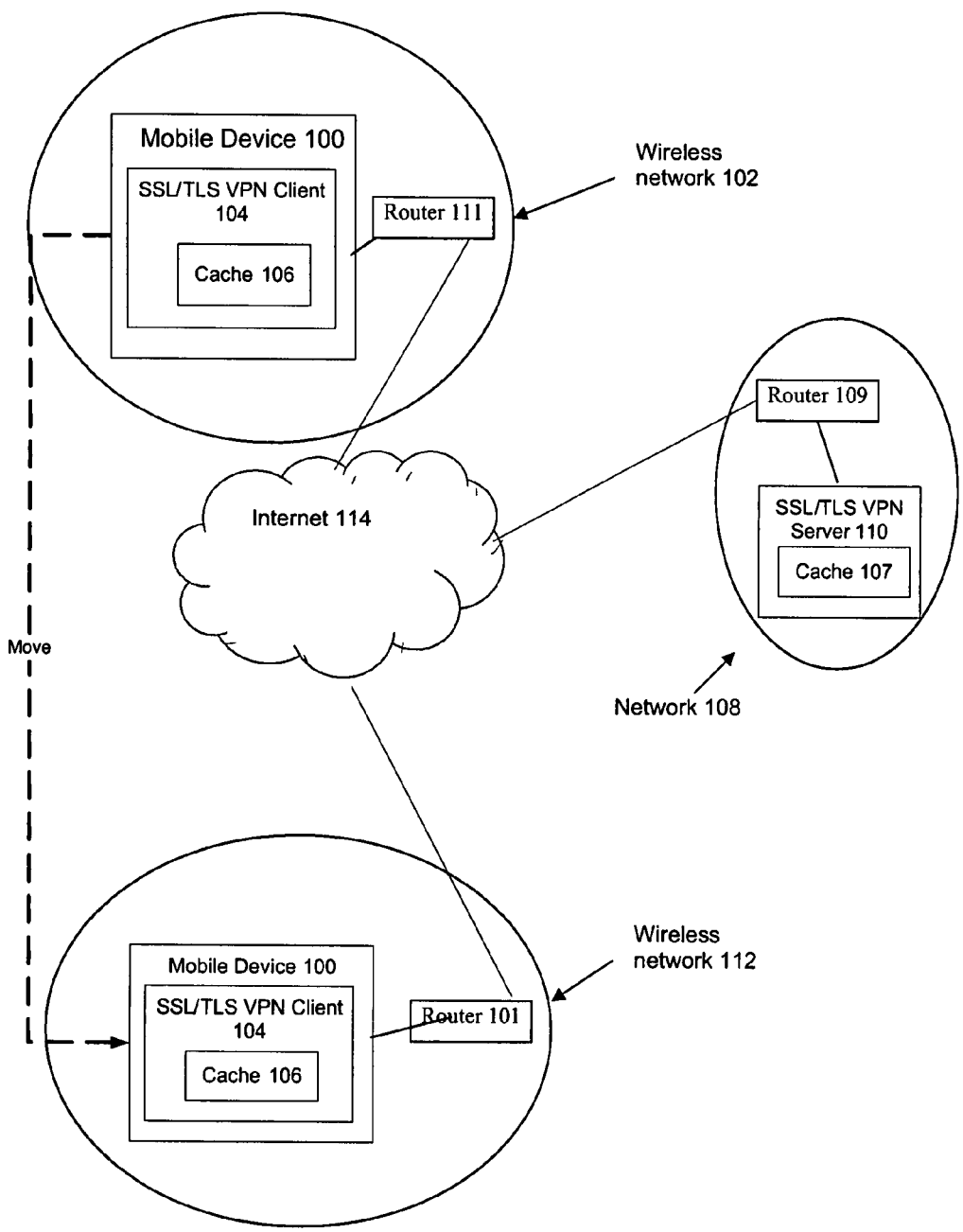
FIG. 1 shows a functional block diagram of a system implementing a mobile secure socket layer, according to an embodiment of the present invention.

FIG. 1 shows a system 90 including a VPN client 104 in a mobile device 100, and a VPN communication module server 110 implementing a SSL/TL VPN server function, in a target network 108. The client 104 and the communication server 110 enable the mobile device 100 to establish and maintain a SSL/TLS VPN connection with the communication server 110, when the mobile device 100 hands off from one connecting network 102 to another connecting network 112.

The system 90 implements a mobile secure socket layer, according to an embodiment of the present invention. The mobile device 100 connects to the first (connecting) network 102 and obtains an IP address from the network 102. The mobile device 100 includes the SSL/TLS client 104, according to the present invention, which establishes and maintains a SSL/TLS connection session with the SSL/TL VPN server 110, also according to the present invention. The SSL/TLS client 104 includes a cache 106 that maintains data sent out from the SSL/TLS client 104 during temporary network loss.

In the example system 90, the SSL/TLS server 110 is in the second (target) network 108. The SSL/TLS server 110 allows the SSL/TLS client 104 to establish a VPN connection to the network 108, and maintain the VPN connection during the migration of the SSL/TLS client 104 from the network 102 to the third (connecting) network 112 (as shown by the dashed line with an arrow). The SSL/TLS server 110 also includes a cache 107 to maintain data sent out from the SSL/TLS server 110 when a connection to the SSL/TLS client 104 is temporarily lost.

The networks 102, 108 and 112 can be any type of networks, such as Ethernet, WiFi, cellular networks, with at least a conventional network router (i.e., a router 101 in the network 102, a router 111 in the network 112 and a router 109 in the network 108). The networks 102, 108 and 112 are connected via the Internet 114. The connections between the networks 102, 108 and 112 and the Internet 114 can be wide area networks, such as DSL, cable, TI, etc. The networks 102, 108, 112 can be wired or wireless networks.

The mobile device 100 can communicate with each of the networks 102 and 112 over a network medium, such as WiFi, a cellular network, Ethernet. In turn, the connecting networks 102 and 112 communicate with the target network 108 via the Internet 114. When communicating with the network 102, the mobile device 100 can establish communication with the target network 108 via the network 102 (and the Internet 114). When communicating with the network 114, the mobile device 100 can establish communication with the target network 108 via the network 112 (and the Internet 114).

The SSL/TLS VPN connection session between the mobile device 100 and the target network 108 (e.g., a home network, an enterprise network) is maintained when the mobile device 100 hands off (moves) from the connecting network 102 to the connecting network 112.

Figure 2:
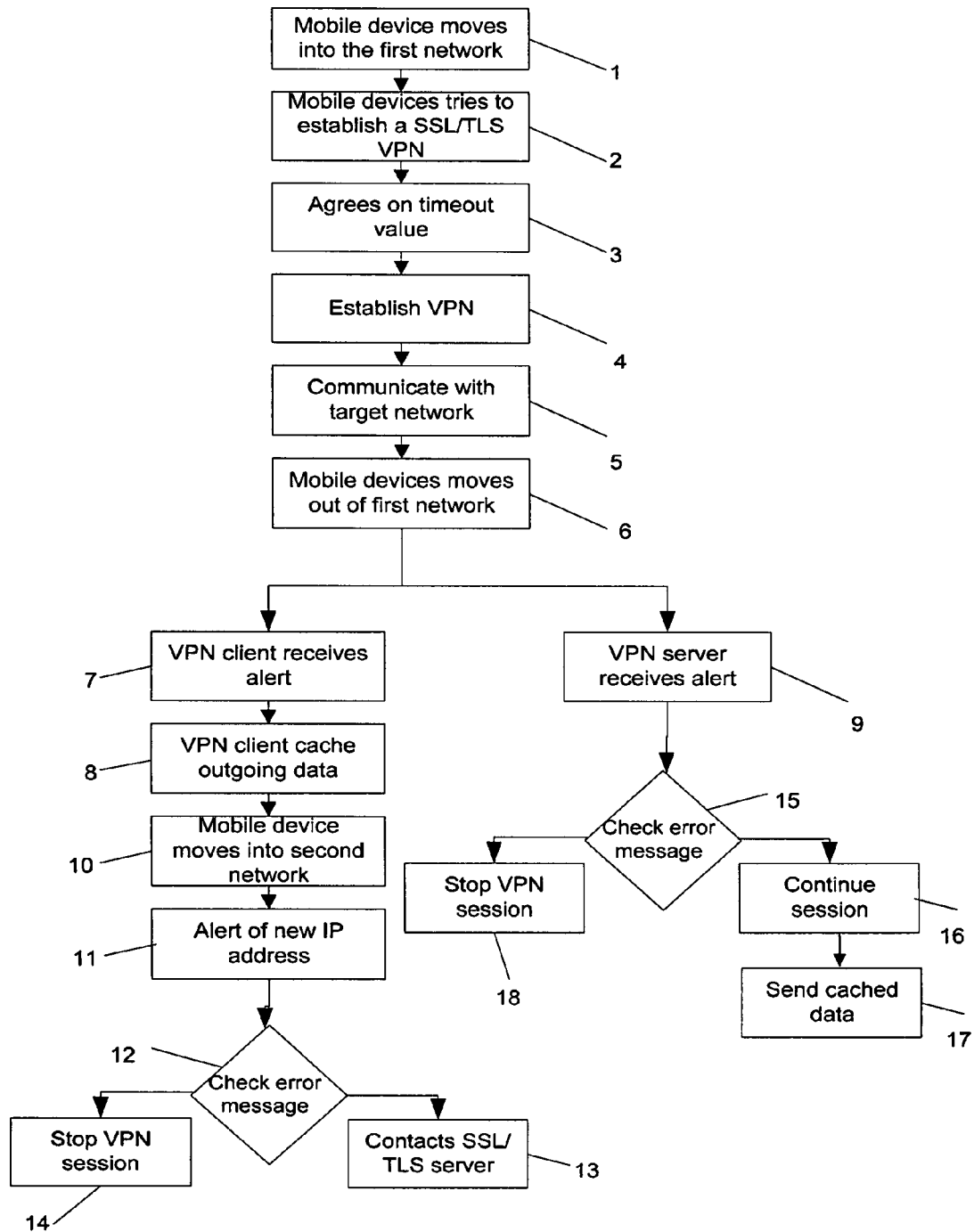
FIG. 2 shows a flowchart of a process for maintaining a VPN connection for a mobile device while it moves from one network to another network, according to an embodiment of the present invention.

FIG. 2 shows a flowchart of a SSL process implemented in the system 90 of FIG. 1, including the steps of:

1. The mobile device 100 moves into the first wireless network 102, establishes communication with the conventional router 111, and is assigned a private IPv4 address in the network 102.
2. The client 104 in the mobile device 100 contacts the SSL/TLS VPN server 110 in the target network 108 via the network 102 and the Internet 114), to try to establish a VPN connection session using the enhanced TLS/SSL handshaking process (i.e., standard handshaking and timeout value agreement) and VPN establishing process.
3. During the TLS/SSL handshaking between the SSL/TLS VPN client 104 and the SSL/TLS VPN server 110, in addition to the standard TLS/SSL, the client 104 and the server 110 agree on a timeout value (timeout period). The timeout value determines the length of time the cache 106 stores the outgoing data from the SSL/TLS VPN client 104 to the SSL/TLS VPN server 110 during a hand off to the network 112 that causes a connection loss between the client 104 and the network 102. The timeout value also determines the length of time the cache 107 stores the outgoing data from the SSL/TLS VPN server 110 to the TLS/SSL VPN client 104 during such a connection loss.
4. After TLS/SSL handshaking, the SSL/TLS VPN client 104 establishes a TLS/SSL session with the SSL/TLS VPN server 110, and receives a TLS/SSL session ID, which is a unique identification described in the standard TLS/SSL specification. Once the TLS/SSL session is established, the VPN client 104 and SSL/TLS VPN server 110 proceed to establish a VPN on top of the established TLS/SSL session with standard VPN procedure.
5. The mobile device 100 can then communicate with the TLS/SSL VPN server 110 within the target network 108, via the network 102 and the Internet 114.
6. At a later time, the mobile device 100 moves out of the first wireless network 102, wherein the connection to the first wireless network 102 is lost.
7. The SSL/TLS VPN client 104 receives an alert message from the network stack, such as TCP/IP stack, on the device 100, indicating that the client 104 has lost connection to the network 102. The client 104 starts a timer with said agreed upon timeout value.
8. The mobile device 100 can continue to send data to the TLS/SSL VPN server 110 in the network 108. However, such data is cached by the cache 106 in the client 104. The cache 106 temporarily caches the outgoing data until the timer times out, at which time, if the mobile device 100 has not resumed the VPN session with the TLS/SSL VPN server 110 (e.g., via another connecting network) the cache 106 clears the temporary data and informs the SSL/TLS VPN client 104 of a fatal error. As such, when the timer expires and the mobile device 100 has not resumed the VPN session with the TLS/SSL VPN server 110, the VPN session is considered to be lost, and data in the cache 106 is flushed.
9. When the mobile device 100 moves out of the first wireless network 102, at the same time the SSL/TLS server 110 also receives an alert from its network stack, such as the TCP/IP stack, on the server 110, about the connection loss with the client 104, and starts a timer with said agreed upon timeout value. The SSL/TLS server 110 in the network 108 can continue to send data to the mobile device 100. That data is cached by the cache 107. The cache 107 temporarily caches the outgoing data until the timer times out, at which time, if the session between the server 110 and the client 104 has not resumed (e.g., via another connecting network), then the cache 107 clears the temporary data and informs the SSL/TLS server 110 of the fatal error.

10. When the mobile device 100 moves into the network 112, the client 104 establishes communication with the network 112 and a new private IPv4 address for the client 104 in the network 112 is provided by the conventional router 101.

11. The SSL/TLS client 104 receives an alert from its network stack, such as the TCP/IP stack, indicating the availability of the new IP address (i.e., IPv4 address).

12. The SSL/TLS client 104 checks whether it has received a fatal error message due to a time out on its own cache 106.

13. If the SSL/TLS VPN client 104 has not received such fatal error message, the client 104 contacts the SSL/TLS VPN server 110 in the target network 108 and sends the session ID obtained in step 4, and issues a session resumption request to resume the VPN session using known SSL/TLS standard. The present invention does not require change to the standard VPN establishing handshaking, and in the SSL handshaking in this example the present invention utilizes the standard SSL resume request for SSL session resumption, and provides the additional features of exchange timeout, and caching according to the present invention.

14. Otherwise, if the SSL/TLS VPN client 104 has received such fatal error message, then the SSL/TLS VPN client 104 stops the VPN session and informs the mobile device 100 that the VPN session is lost and needs to be re-established (e.g., via the network 112).

15. When the SSL/TLS VPN server 110 receives the session resumption request and session ID from the SSL/TLS VPN client 104 in step 13 above, the server 110 checks if it has received a fatal error message from its own cache 107.

16. If the SSL/TLS server 110 has not received such fatal error message, the server 110 continues (resumes) the TLS/SSL session with the SSL/TLS VPN client 104 and may renegotiate new session keys/IDs. Once the TLS/SSL session has been resumed, the server 110 and the client 104 proceed to re-establish the VPN session using the same information obtained in step 4, such as assigning VPN IP addresses to both server 110, client 104, setting up routing tables in both server 110, client 104

17. Once the existing session is resumed, the SSL/TLS VPN client 104 and the SSL/TLS VPN server 110 each sends out the cache data in their respective caches 106 and 107 to their intended recipients, and clears their cache contents. As such, the client 104 sends to the server 110 those packets in the cache 106 that were intended for the network 108, via the connecting network 112 and the Internet 114. Further, the server 110 sends out those packets in the cache 107 that were intended for the mobile device 100, via the Internet 114 and the connecting network 112.

18. If the SSL/TLS VPN server 110 has received a fatal error message, the server 110 rejects the session resumption request from the SSL/TLS VPN client 104 in step 14, and forces the client 104 to re-establish a VPN connection with the server 110.

Accordingly, the present invention enables the mobile device 100 to maintain a SSL/TLS VPN despite differing network attachments at different times. The outbound packets from the client 104 in the mobile device 100 to a VPN server 110 in the network 108 are cached during the network handoff when the mobile device 100 moves from the network 102 to the network 112.

Likewise, during the handoff, the outbound packets from the sever 110 in the target network 108, to the client 104 in the mobile device 100, are cached in the cache 107 (i.e., the packets in the caches 106 and 107 are sent to their intended recipients once the handoff is successfully completed).

The resume feature of the SSL/TLS protocol is utilized such that when the mobile device 100 moves (hands off) from the network 102 to the network 112, the SSL/TLS client 104 in the mobile device 100 resumes the SSL/TLS session with the server 110 in the target network 108, instead of establishing a new session.

As such, the present invention enables maintaining a mobile SSL/TLS VPN connection (session) between the mobile device 100 and the network 108, when the mobile device 100 hands off (moves) from the network 102 to the network 112.

Further, the present invention does not require changes to the current IPv4 network infrastructure, and operates with the proven SSL/TLS protocol with no change.

Though in the example implementation shown in FIG. 1 the Internet 114 is shown as the communication medium between the connecting network 102 and the target network 108, the present invention is not limited to such implementations. As such, the network 102 can be connected to the target network 108 by other communication medium such as, e.g., wired, wireless, optical, other networks, or combinations thereof. Further, though in the example implementation shown in FIG. 1 the Internet 114 is shown as the communication medium between the connecting network 112 and the target network 108, the present invention is not limited to such implementations. As such, the network 112 can be connected to the target network 108 by other communication medium, such as, e.g., wired, wireless, optical, other networks, or combinations thereof. Further, the communication medium between the network 102 and the network 108 can be different from the communication medium between the network 112 and the network 108.

Figure 3:
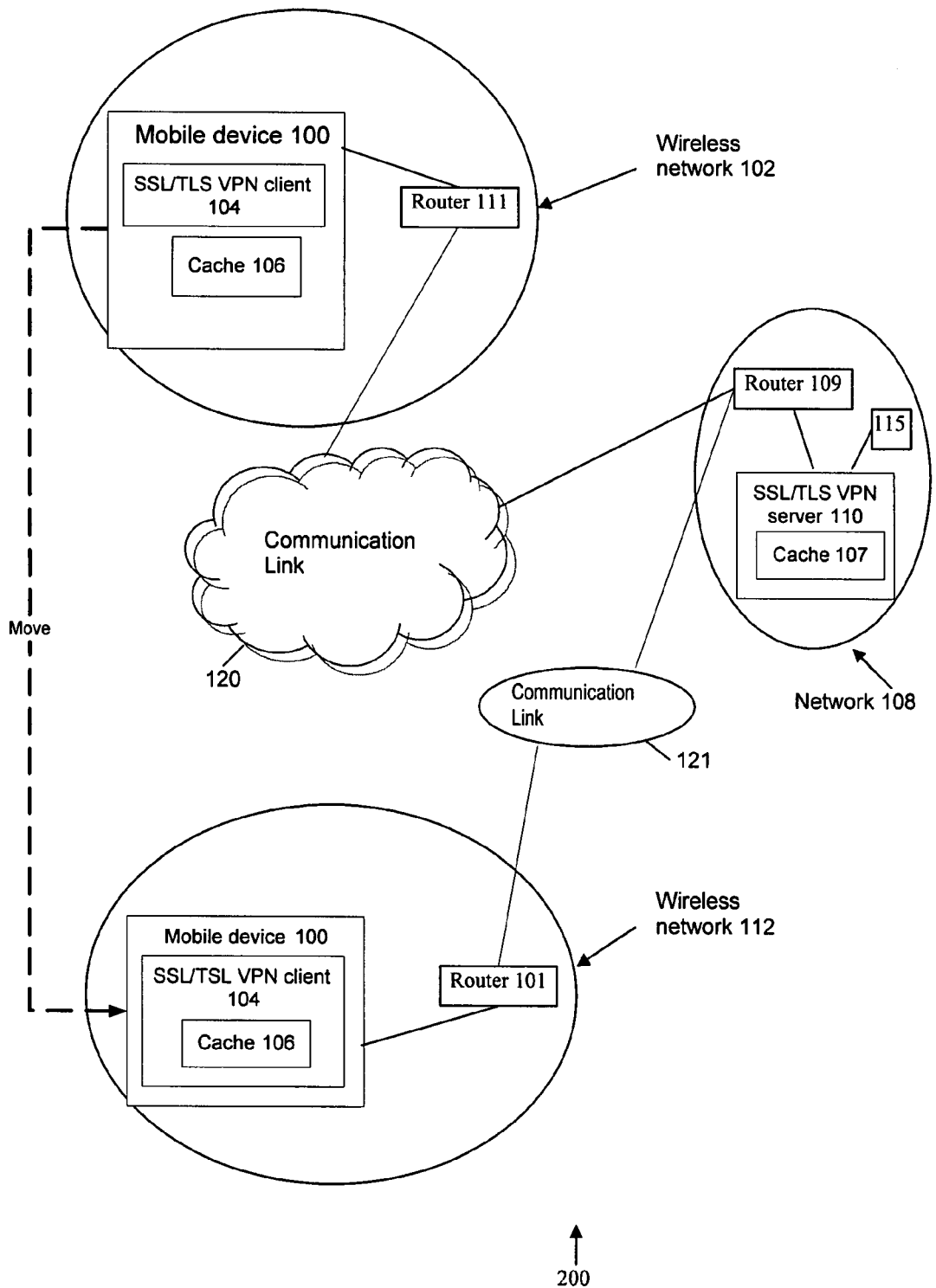
FIG. 3 shows a functional block diagram of another system implementing a mobile secure socket layer, according to an embodiment of the present invention.

FIG. 3 shows a functional block diagram of another system 200 implementing a mobile secure socket layer, according to an embodiment of the present invention. In the system 200, the network 108 includes at least one SSL/TLS server 110 which the mobile device 100 communicates with via the VPN session established, and maintained, between the client 104 and the server 110. The network 102 shows a SSL/TLS VPN client 104 which allows the mobile device 100 to connect to the server 110 for establishing a SSL/TLS VPN session with the server 110 via the network 102 and a communication link 120.

The network 112 shows a SSL/TLS VPN client 104 which allows the mobile device 100 to connect to the server 110 for establishing a SSL/TLS VPN session with the server 110 via the network 112 and a communication link 120. The communication link 120 may be of the same type, or a different type, than the communication link 121.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of virtual private network communication for a mobile device, comprising:
   establishing a virtual private network (VPN) communication session between a mobile device and a SSL/TLS VPN communication server, comprising:
   establishing a secure connection between the mobile device and a first network;
   establishing a secure connection between a SSL/TLS VPN client in the mobile device and the SSL/TLS VPN communication server in a second network via the first network which is connected to the second network by a communication medium including a handshake procedure negotiating a timeout value which determines a maximum length of time a cache memory in the mobile device and a cache memory in the communication server stores data; and
   continuing said virtual private network communication session for the mobile device and the SSL/TLS VPN communication server during handoff between networks, comprising:
   maintaining the secure connection between the mobile device and the SSL/TLS VPN server in the second network when the mobile device hands off from the first network to a third network which is connected to the second network via a communication medium;
   upon temporary loss of connection with the communication server via the first network storing all outgoing data from the client in the mobile device to the communication server for a first time period in a first cache memory disposed in the mobile device; and
   upon handoff occurring before a time period not exceeding the timeout value, the SSL/TLS VPN client in the mobile device issuing a SSL session resumption request to the SSL/TLS VPN server for resuming said virtual private network communication session instead of establishing a new virtual private network session;
   wherein a mobile connection between the mobile device and the communication server comprises a SSL/TLS VPN session that is maintained for handoffs not exceeding the timeout value.

2. The method of claim 1 wherein:
   the mobile device communicating with the first network includes the mobile device obtaining an IP address from the first network.

3. The method of claim 2 further comprising:
   upon hand off from the first network to the third network, the mobile device establishing communication with the third network; and
   the mobile device maintaining the session with the communication server in the second network when the mobile device hands off from the first network to the third network.

4. The method of claim 3 wherein the mobile device establishing communication with the third network further includes the mobile device obtaining an IP address from the third network.

5. The method of claim 4 further comprising:
   while the first time period has not expired, the client in the mobile device contacting the communication server in the second network via the third network, and using a session resumption request;
   otherwise if the first time period expired, then the client in the mobile device stopping the VPN session with the communication server in the second network.

6. The method of claim 5 further comprising:
   upon receiving a resumption request, the communication server in the second network determining if the second time period expired, such that:
   if the second time period has not expired, then the communication server in the second network resumes the SSL/TLS VPN session with the client in the mobile device, and sends the respective cached packets to their intended recipients;
   otherwise, if the second time period has expired, then the communication server in the second network rejecting the session resumption request and forcing the client to reestablish a VPN session with the communication server in the second network.

7. The method of claim 1, further comprising:
   the mobile device using a standard unmodified Internet protocol; and
   the mobile connection between the mobile device and the communication server in the second network operating with an unmodified standard SSL/TLS protocol.

8. The method of claim 7, wherein the Internet protocol is an Internet Protocol version 4 (IPv4) protocol.

9. The method of claim 1, wherein the mobile device hands off from the first network to a third network after authentication of the mobile device.

10. The method of claim 9, wherein maintaining the secure connection between the mobile device and the server in the second network when the mobile device hands off from the first network to the third network which is connected to the second network via a communication medium results in seamless continuation of communication with the mobile device.

11. A system for mobile virtual private network communication between a mobile device and a target network via connecting networks, comprising:
    a SSL/TLS VPN client module and a SSL/TLS VPN server module, the client module and the server module configured to establish a virtual private network communication session therebetween, wherein the client module is coupled to a first cache memory in the mobile device, the client module configured to establish a connection to a first connecting network, and to further establish a secured mobile connection between the mobile device and a target network via the first connecting network, the client module and the server module configured to utilize a handshake procedure to negotiate a timeout value which determines a maximum length of time the first cache memory in the mobile device and a second cache memory in a communication server stores data; and
    the server module configured to establish a secured mobile connection with the client module via the first connecting network;
    wherein the client module and the server module are configured to continue said virtual private network communication session during- handoff between networks, wherein the client module maintains a secure mobile connection between the mobile device and the target network if the mobile device hands off from the first connecting network to a second connecting network, such that:
    upon temporary loss of connection with the server module via the first connecting network, the client module stores all outgoing data from the client module in the mobile device to the server module for a first time period in the first memory of the client device; and upon temporary loss of connection with the mobile device via the first connecting network, the server module stores all outgoing data from the server module in the target network to the client module in the mobile device for a second time period in the second cache memory; and upon handoff occurring before a timeout value not exceeding the timeout value the client in the mobile device issuing a SSL session resumption request to the server module resuming said virtual private network communication session with the server module instead of establishing a new virtual private network session;

wherein a mobile connection between the mobile device and the communication server comprises a SSL/TLS VPN session that is maintained for handoffs not exceeding the timeout value.

12. The system of claim 11 wherein:
the client module is configured to communicate with the first connecting network to obtain an IP address in the first connecting network.

13. The system of claim 12 wherein the client module is configured such that if the mobile device hands off to the second connecting network, the client module establishes communication with the second connecting network.

14. The system of claim 13 wherein the client module is further configured to establish communication with the second connecting network by obtaining an IP address in the second connecting network.

15. The system of claim 14 wherein the client module is configured such that: if the first time period has not yet expired, then the client module contacts the server module via the second connecting network, and issues a session resumption request to the server module;

otherwise, if the first time period has expired, then the client module stops the VPN session with the server module.

16. The system of claim 15 wherein the server module is configured such that upon receiving the resumption request, the server module determines if the second time period expired, wherein:

if the second time period has not expired, then the server module resumes the SSL/TLS VPN session with the client in the mobile device via the second connecting network, and sends the respective cached packets to their intended recipients;

otherwise, if the second time period has expired, then the server module rejects the session resumption request and forces the client module to re-establish a VPN session with the server module.

17. A mobile communication device to support virtual private networking, comprising:

a client module of a mobile device configured to establish a SSL/TLS VPN virtual private network communication with a first connecting network, and further establish a secured mobile communication session between the mobile device and a target module of a server via the first connecting network;

a first cache disposed in the client device for storing outgoing packets from the client module; and wherein the client module is configured to negotiate a timeout value during a handshaking procedure with the target module to determines a maximum length of time to attempt to resume the virtual private communication session during handoff, the client module further configured to continue said SSL/TLS VPN virtual private network communication session for the mobile device and the target module during handoff between networks by maintaining the secured mobile communication session between the mobile device and the target module, including: when the mobile device hands off from the first connecting network to a second connecting network, storing all outgoing packets intended for the target module during hand off to the second connecting network in the first cache and issuing a SSL session resumption request to resume said virtual private network communication session with the server module instead of establishing a new virtual private network session.

18. The mobile communication device of claim 17 wherein:
the client module is configured to communicate with the first connecting network to obtain an IP address in the first connecting network; and
the client module comprises a SSL/TLS VPN client configured to communicate with the target module via the first connecting network to establish a VPN session.

19. The mobile communication device of claim 18 wherein the client module is configured such that if the mobile communication device hands off from the first connecting network to the second connecting network, the client module resumes the session with the target module via the second connecting network.

20. The mobile communication device of claim 19 wherein the client module is further configured to establish communication with the second connecting network by obtaining an IP address in the second connecting network.

21. The mobile communication device of claim 20 wherein the client module is configured such that:
if the first time period has not yet expired, then the client module contacts the server module via the second connecting network, and issues a session resumption request to the server module;

otherwise, if the first time period has expired, then the client module stops the VPN session with the server module.

22. The mobile communication device of claim 17 wherein the target module comprises a server module.

23. The mobile communication device of claim 17 wherein the target module comprises a server module in a target network.

24. An apparatus for establishing mobile communication with a mobile device via connecting networks, comprising:
a communication server configured to establish a secured mobile virtual private network communication session with a client module of a mobile device via a first connecting network;
a first cache in the mobile device for caching outgoing packets from the client module; and
a second cache for caching outgoing packets from the communication server;
wherein the client module is further configured to continue said virtual private network communication session for the mobile device and the communication server during handoff between networks by maintaining the secured mobile communication session, including: when the mobile device hands off from the first connecting network to a second connecting network, caching all outgoing packets intended for the communication server in the first cache, and the communication server storing all out going packets intended for the client module in the second cache; and
upon handoff occurring before a timeout value, the client in the mobile device resuming said virtual private network communication session with the communication server by issuing a resumption request, instead of establishing a new virtual private network session;

wherein said secure connection between the mobile device and the communication comprises a SSL/TLS VPN session, the communication server comprises a SSL/TLS VPN server configured to communicate with the mobile device via the first connecting network for establishing a VPN session with the mobile device, and to maintain the VPN session upon hand off of the mobile device from the first connecting network to the second connecting network.

25. The apparatus of claim 24 wherein the communication server is further configured such that upon loss of connection with the mobile device, the server in the communication server caches outgoing packets to the mobile device, for a time period.

26. The apparatus of claim 25 wherein the communication server is further configured such that upon receiving a session resumption request from the mobile device via the second connecting network, the server module determines if the time period expired, wherein:

if the time period has not expired, then the communication server resumes the SSL/TLS VPN session with the mobile device via the second connecting network, and sends the respective cached packets to their intended recipients;

otherwise, if the time period has expired, then the communication server rejects the session resumption request.

27. A method of communication for a mobile device, comprising:

establishing a virtual private network communication session between a mobile device and a communication server, comprising:

establishing a secure connection between a mobile device and a first network;

establishing a secure connection between a client in the mobile device and a communication server in a second network via the first network which is connected to the second network by a communication medium, the mobile device communicating with the first network via a wireless medium, and in turn the first network communicating with the communication server in the second network over the communication medium, wherein the mobile device obtaining an IP address from the first network and a session identification from the communication server, wherein the client comprises a SSL/TLS VPN client and the communication server comprises a SSL/TLS VPN server, such that he mobile device establishing a connection with the communication server in the second network further includes the SSL/TLS VPN client in the mobile device contacting the SSL/TLS VPN server in the second network via the first network to establish a VPN session; and continuing said virtual private communication session for the mobile device and the communication server during handoff between networks, comprising:

maintaining the secure connection between a mobile device and the server in the second network when the mobile device hands off from the first network to a third network which is connected to the second network via a communication medium;

upon temporary loss of connection with the communication server via the first network, storing all outgoing data from the client in the mobile device to the communication server for a time period in a first cache; and upon handoff occurring before a timeout value not exceeding the caching limits of the first cache memory and the second cache memory, the client in the mobile device issuing a session resumption request for resuming said virtual private network communication session with the communication server, instead of establishing a new virtual private network session.

* * * * *